US010768425B2

(12) United States Patent
Carpenter et al.

(10) Patent No.: US 10,768,425 B2
(45) Date of Patent: Sep. 8, 2020

(54) AUGMENTED REALITY MONITORING OF BORDER CONTROL SYSTEMS

(71) Applicant: Securiport LLC, Washington, DC (US)

(72) Inventors: Nathan Carpenter, Washington, DC (US); Edward Roderick, Washington, DC (US); Enrique Segura, Washington, DC (US)

(73) Assignee: SECURIPORT LLC, Washington, DC (US)

( * ) Notice: Subject to any disclaimer, the term of this patent is extended or adjusted under 35 U.S.C. 154(b) by 0 days.

(21) Appl. No.: 15/897,115

(22) Filed: Feb. 14, 2018

(65) Prior Publication Data

US 2018/0231785 A1  Aug. 16, 2018

Related U.S. Application Data

(60) Provisional application No. 62/458,732, filed on Feb. 14, 2017.

(51) Int. Cl.
| | |
|---|---|
| *G02B 27/01* | (2006.01) |
| *G06T 19/00* | (2011.01) |
| *G02B 27/32* | (2006.01) |
| *G07C 9/00* | (2020.01) |
| *G06Q 50/26* | (2012.01) |
| *G07C 9/25* | (2020.01) |

(52) U.S. Cl.
CPC ......... *G02B 27/0172* (2013.01); *G02B 27/32* (2013.01); *G06Q 50/265* (2013.01); *G06T 19/006* (2013.01); *G07C 9/00* (2013.01); *G07C 9/253* (2020.01); *G02B 27/017* (2013.01); *G02B 2027/0178* (2013.01)

(58) Field of Classification Search
CPC ........ G02B 2027/0178; G02B 27/0172; G02B 27/32; G06T 19/006
See application file for complete search history.

(56) References Cited

U.S. PATENT DOCUMENTS

| | | | | |
|---|---|---|---|---|
| 2006/0028556 A1* | 2/2006 | Bunn | ...................... | G10L 15/25 348/211.99 |
| 2011/0221656 A1* | 9/2011 | Haddick | ............ | G02B 27/0172 345/8 |
| 2012/0019557 A1* | 1/2012 | Aronsson | ................ | G06T 11/00 345/633 |
| 2012/0081394 A1* | 4/2012 | Campbell | ............. | G06T 19/006 345/633 |
| 2014/0055488 A1* | 2/2014 | Masters | .................. | G06F 3/147 345/633 |
| 2014/0267010 A1* | 9/2014 | Pasquero | ................ | G06F 3/013 345/156 |

(Continued)

*Primary Examiner* — Patrick N Edouard
*Assistant Examiner* — Peijie Shen
(74) *Attorney, Agent, or Firm* — Miles & Stockbridge P.C.

(57) ABSTRACT

An augmented-reality device is provided. The augmented-reality device is configured to retrieve security information for a plurality of persons at respective security checkpoints. In addition, the augmented-reality device is configured to concurrently display the security information for each of the plurality of persons on an augmented-reality display. Security information is superimposed on or adjacent to each of the plurality of persons located at respective security checkpoints, the display configured to maintain visibility of the security checkpoint.

20 Claims, 6 Drawing Sheets

(56) References Cited

U.S. PATENT DOCUMENTS

| | | | | |
|---|---|---|---|---|
| 2014/0294257 A1* | 10/2014 | Tussy | ............... | H04W 12/02 |
| | | | | 382/118 |
| 2015/0040008 A1* | 2/2015 | Redenshek | ........ | G01R 33/4814 |
| | | | | 715/719 |
| 2015/0235423 A1* | 8/2015 | Tobita | ............... | G06T 19/006 |
| | | | | 345/633 |
| 2015/0371445 A1* | 12/2015 | Karrer Walker | ........ | G06F 16/93 |
| | | | | 345/632 |
| 2016/0285950 A1* | 9/2016 | Lang | ............... | G07C 9/253 |
| 2017/0249745 A1* | 8/2017 | Fiala | ............... | G06T 7/277 |
| 2017/0351909 A1* | 12/2017 | Kaehler | ............... | G06K 9/6215 |
| 2017/0358131 A1* | 12/2017 | Weiss | ............... | G06T 19/006 |

* cited by examiner

600

AUGMENTED REALITY MONITORING OF BORDER CONTROL SYSTEMS

PRIORITY APPLICATION

This application claims the benefits of U.S. Provisional Patent Application No. 62/458,732, filed on Feb. 14, 2017, which is incorporated herein by reference in its entirety.

FIELD OF INVENTION

The systems, methods, and apparatuses described herein relate to improved checkpoint security and control using computer-implemented techniques, and more particularly, toward the use of augmented-reality (AR) for identification of a person of interest at a security checkpoint such as a national border or other secure entry checkpoint.

BACKGROUND

For identification and security purposes, persons travelling via air, land, and/or water typically must pass through one or more checkpoints, at which their travel documents, such as driver licenses or passports, are verified. Border officers face challenges posed by a wide range of demographics. Travelers include people from all walks of life and of all ages. Some demographics, such as children, may pose no security threat while other demographics may pose higher security risks. The conventional way of verifying the travelers is to check each traveler's identification information (e.g., name, date of birth, etc.) against a watch list maintained in a computer database. If a traveler's identification matches an entry in the watch list, the traveler may receive special treatment, such as being further questioned, detained, rejected, and deported, etc.

While checking travelers' information against the watch list, border and/or security officers have limitations as to how much information they can mentally process while maintaining situational awareness. In the border security area, for example, the border officer is frequently placed in charge of monitoring travelers passing through an immigration checkpoint. The immigration checkpoint may contain multiple manned immigration booths as well as unmanned automated border control systems, such as kiosks or electronic gates. The border officer must maintain full situational awareness to detect potential threats while assisting travelers having difficulty with the systems and making clearance decisions on travelers when issues with their identity documentation are identified. Typically, the border officer monitors no more than seven systems at once to prevent the border officer from being overwhelmed with information that would cause them to miss potential security or traveler issues.

As security or border officers grapple with security decisions, they are often limited by the lack of technology. Accordingly, systems, methods, and apparatuses that enable security or border officers to monitor multiple systems within immigration or other security checkpoints are needed. To this end, the embodiments of the present invention enable the use of augmented-reality to monitor checkpoints and to identify a person of interest.

SUMMARY OF THE INVENTION

Embodiments of the present invention are directed toward electronic devices configured to provide augmented-reality monitoring for border control systems and/or other security checkpoints that substantially improve upon the related art.

Features and advantages of the embodiments are set forth in the description which follows, or will be apparent from the description, or may be learned by practice of the invention.

In one example, the augmented-reality device includes a processor, and a non-transitory memory storing one or more programs for execution by the processor, the one or more programs including instructions for retrieving security information for a plurality of persons at respective security checkpoints, and concurrently displaying the security information for each of the plurality of persons on an augmented-reality display, wherein the security information is superimposed on or adjacent to each of the plurality of persons located at respective security checkpoints, the displaying configured to maintain visibility of the security checkpoint.

It is to be understood that both the foregoing general description and the following detailed description are exemplary and explanatory and are not intended to limit the invention to the described examples.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
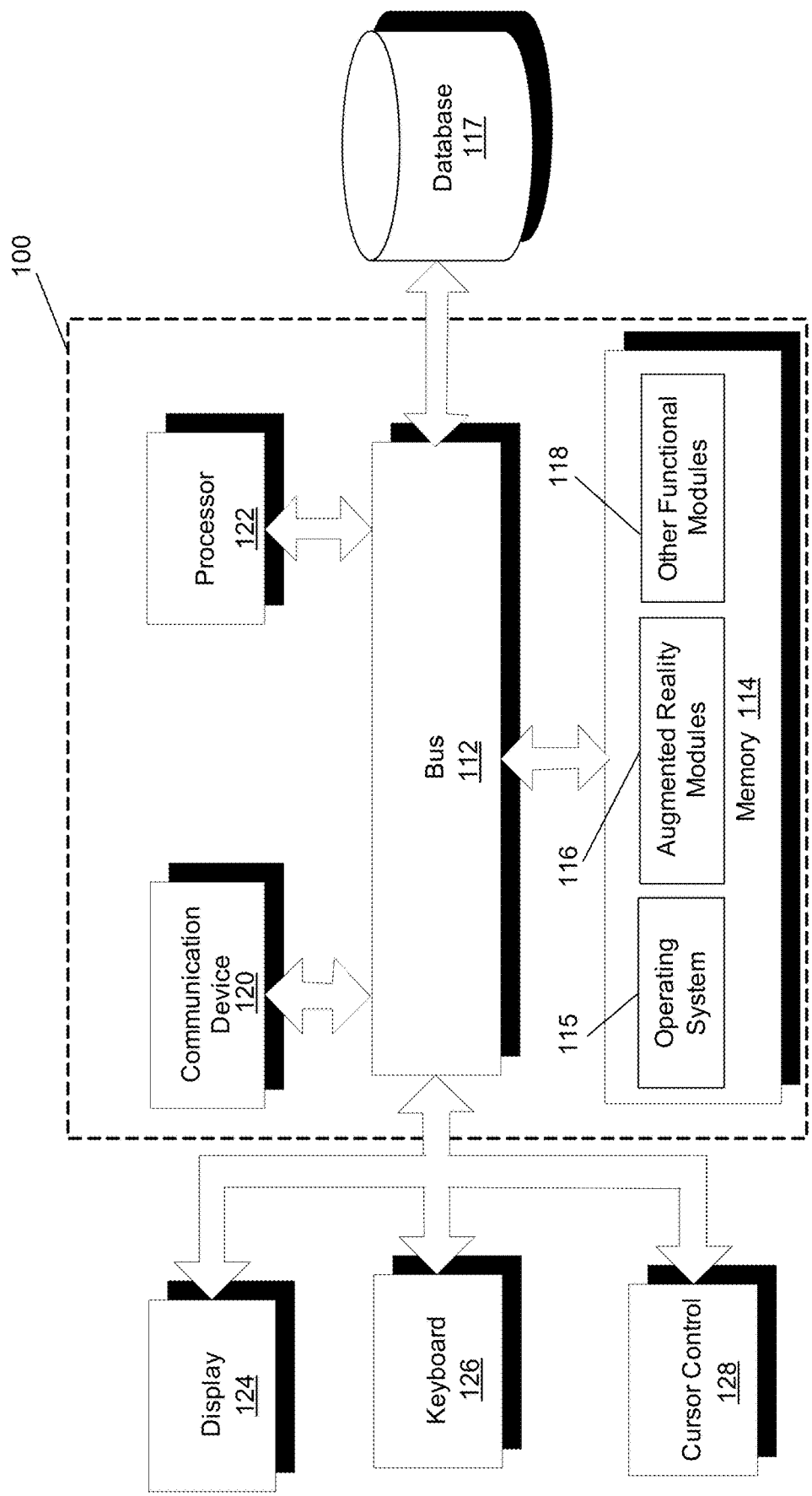
FIG. 1 is a block diagram of a computer server/system according to an example embodiment of the present invention.

According to the embodiments of the present invention, an augmented-reality device is used to enable a security officer to concurrently (e.g., simultaneously) monitor multiple physically-manned or automated border control devices or entry control devices, such as immigration kiosks, electronic gates, or manned posts while maintaining full visibility of the area being monitored. Use of augmented-reality enables the real-time monitoring of detailed information that is visually superimposed on one or more persons (e.g., travelers) transiting the system, without losing situational awareness of the entire area being monitored.

In some embodiments, a monitoring application is provided using augmented-reality glasses. Here, the status of all systems in the immigration or security checkpoint, the processing status of the persons (e.g., travelers) passing through the checkpoint, and/or other information regarding the environment around the persons, may be superimposed in an officer's field of view. Alternatively, other embodiments provide a monitoring application on a computer or mobile device (e.g., mobile phone or tablet) that graphically illustrates the area being monitored, the status of all systems in the immigration or security checkpoint, the processing status of the persons (e.g., travelers) passing through the checkpoint, and/or other information regarding the environment around the persons. Additional detailed information about each person may be retrieved if the border or security officer requests it.

By contrast, using known systems, the officer needs to maintain situational awareness on a device screen, which requires taking their eyes off the travelers passing through the immigration point. This loss of visual monitoring opens a window of time for a security threat to arise and potentially evade the security measures in place at the immigration point. This is a challenge that is difficult to overcome without assigning multiple officers to each immigration checkpoint.

Another challenge with known monitoring applications is that the screen layout of a terminal used by the border officer is often significantly different from the physical layout of the immigration point. For example, the gates may be laid out in a right-to-left scheme while the monitor of the terminal shows information in a top-to-bottom layout to maximize screen space. This may lead to confusion about which traveler and which system may be involved when a security or device issue arises. This is difficult to solve in a general way because each immigration checkpoint is laid out differently. It is also difficult to draw the border officer's attention to an area rather than a device. For example, in the event that a chemical signature indicating a hazardous material is detected in the vicinity of a device, the border officer has to further determine the physical location of the device.

In view of the drawbacks of known security solutions, the embodiments enable the use of augmented-reality to monitor security checkpoints. By using augmented-reality devices, a single officer may maintain visibility across the security checkpoint while being able to get detailed information on each system and person simply by looking at them. Implementation of the embodiments also removes the mismatch between the screen layout of the monitoring application and the layout of the physical space, since the officer may look directly at the physical system about which they want to see information.

Some augmented-reality applications use "fiduciary markers" in the environment to determine location. WO2015176163A1, entitled "Fiducial Marker Patterns, Their Automatic Detection in Images, and Applications Thereof", which is hereby incorporated by reference in its entirety, uses fiduciary markers for determining configuration of a virtual space. In the various embodiments of the instant application, a single-camera application with multiple markers is used rather than a multi-camera application with a single marker. Processing functions may be split between the augmented-reality device and the other network connected computers. In addition, hyper-local location sensors and direct image-processing may be used to improve on the use of fiduciary markers alone.

Accordingly, the embodiments of the present invention provide an augmented-reality experience for border or security officers charged with monitoring a security checkpoint. Although a border is often used as example security checkpoint, the embodiments of the invention are not so limited and may be readily applied to any security checkpoints (e.g., borders, concert entry, building entry, etc.). As discussed below, the various embodiments may overlay status information about each system and person in the border officer's visual field through an augmented-reality device, and may provide detailed information about systems or persons that the border officer is directly observing.

Reference will now be made in detail to the embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

User interfaces and associated methods for using a portable electronic device are described. In some embodiments, the device is a mobile phone, tablet, or wearable computer. The user interface may include a touch screen and/or other input/output devices. In the discussion that follows, a portable communications device is used as an example embodiment. It should be understood, however, that the user interfaces and associated methods may be applied to other devices, especially wearable computers and/or augmented-reality glasses, which may include one or more other physical user-interface devices, such as voice command and various sensors.

The portable communication device may support a variety of applications. The various applications that may be executed on the device may use at least one common physical user-interface device. A common physical architecture of the portable communication device may support a variety of applications. In the discussion that follows, a border security application is used as an example embodiment, but it should be understood that the user interfaces and associated methods may be applied to other applications.

FIG. 1 is a block diagram of a computer server system 100 in accordance with an example embodiment of the present invention.

Figure 5:
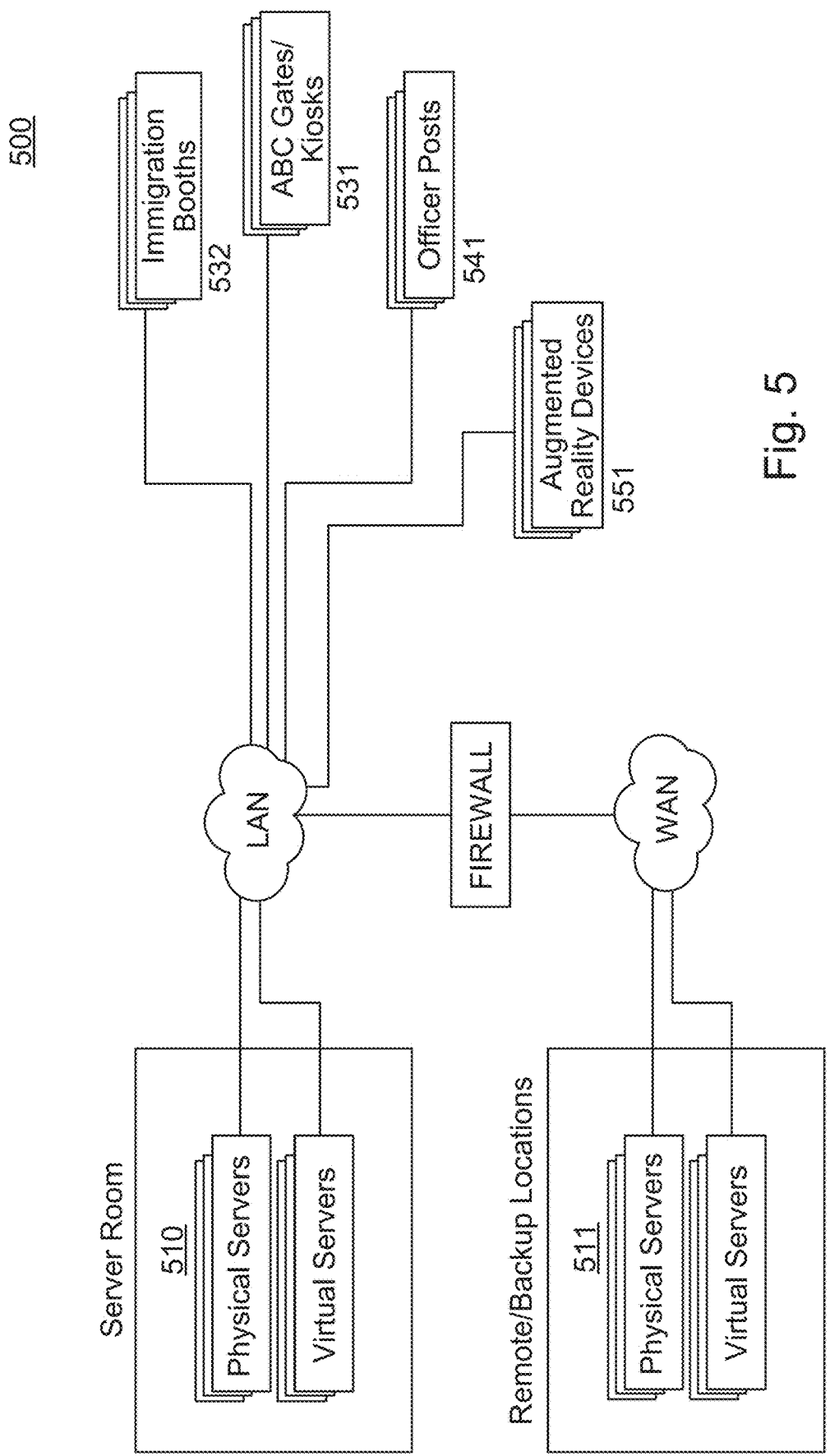
FIG. 5 illustrates a network that is configured to connect various components according to an example embodiment of the present invention.

As shown in FIG. 1, system 100 may include a bus 112 and/or other communication mechanism(s) configured to communicate information between the various components of system 100, such as a processor 122 and a memory 114. In addition, a communication device 120 may enable connectivity between processor 122 and other devices by encoding data to be sent from processor 122 to another device over a network (as shown in FIG. 5) and decoding data received from another system over the network for processor 122.

For example, communication device 120 may include a network interface card that is configured to provide wireless network communications. A variety of wireless communication techniques may be used including infrared, radio, Bluetooth, Wi-Fi, and/or cellular communications. Alternatively, communication device 120 may be configured to provide wired network connection(s), such as an Ethernet connection.

Processor 122 may comprise one or more general or specific purpose processors to perform computation and control functions of system 100. Processor 122 may include a single integrated circuit, such as a micro-processing device, or may include multiple integrated circuit devices and/or circuit boards working in cooperation to accomplish the functions of processor 122.

System 100 may include memory 114 for storing information and instructions for execution by processor 122. Memory 114 may contain various components for retrieving, presenting, modifying, and storing data. For example, memory 114 may store software modules that provide functionality when executed by processor 122. The software modules may include an operating system 115 that provides operating system functionality for system 100. The software modules may further include augmented-reality modules 116 configured to concurrently (e.g., simultaneously) monitor multiple physical manned or automated border control devices or entry control devices, as well as other functional modules 118.

Augmented-reality modules 116 are configured to cause a person (e.g., traveler, concert-goer, employee, etc.) and device information to be visually superimposed, using a wearable display, on one or more persons transiting through a security checkpoint. In some instances, augmented-reality modules 116 may illustrate the movement of travelers and respective traveler information within a security checkpoint. Augmented-reality modules 116 may include one or more application program interfaces ("API") that enable the security or border officers to monitor persons or travelers and their respective identifying information.

Memory 114 may include a variety of computer-readable media that may be accessed by processor 122. For example, memory 114 may include any combination of random access memory ("RAM"), dynamic RAM ("DRAM"), static RAM ("SRAM"), read only memory ("ROM"), flash memory, cache memory, and/or any other type of non-transitory or transitory computer-readable medium.

Processor 122 is further coupled via bus 112 to a display 124, such as a wearable display or augmented-reality glasses. A keyboard 126 and a cursor control device 128, such as a computer mouse, are further coupled to communication device 120 to enable a user to interface with system 100.

System 100 may be part of a larger system. Therefore, system 100 may include one or more additional functional modules, such as functional module 118 to include additional functionality, such as other applications. Other functional modules 118 may include various modules for identifying a person of interest as described in U.S. Patent Application Publication No. 2014/0279640A1, which is incorporated by reference in its entirety.

A database 117 is coupled to bus 112 to provide centralized storage for augmented-reality modules 116 and functional modules 118 and to store a person's or traveler's identifying and/or threat data. Database 117 may store data in an integrated collection of logically-related records or files. Database 117 may be an operational database, an analytical database, a data warehouse, a distributed database, an end-user database, an external database, a navigational database, an in-memory database, a document-oriented database, a real-time database, a relational database, an object-oriented database, or any other database known in the art.

Although illustrated as a single system, the functionality of system 100 may be implemented as a distributed system. Further, the functionality disclosed herein may be implemented on separate servers or devices that may be coupled together over a network. Further, one or more components of system 100 may not be included. For example, system 100 may be a smartphone or tablet device that includes a processor, memory and a display, but may not include one or more of the other components shown in FIG. 1.

Figure 2:
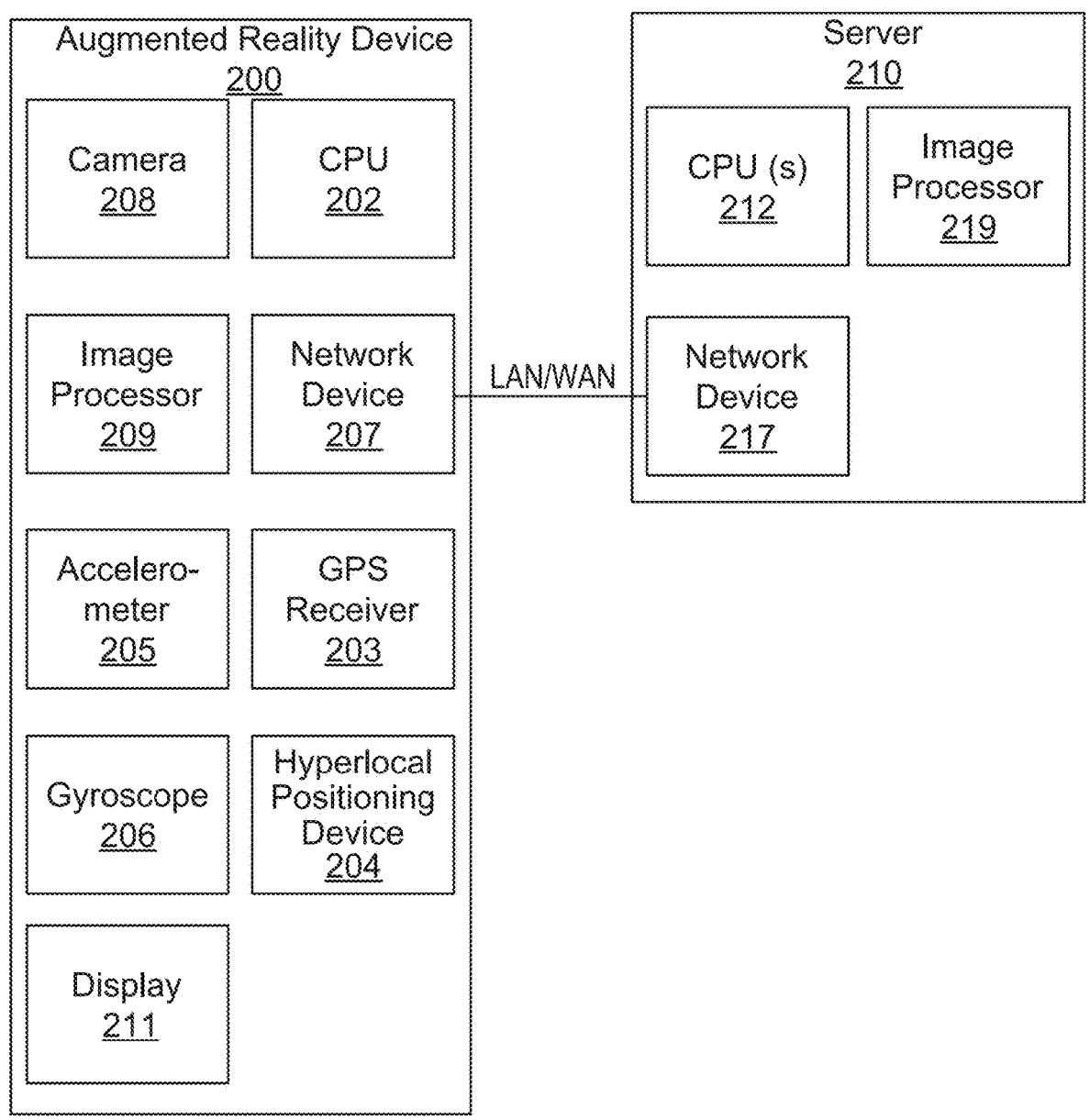
FIG. 2 illustrates an augmented-reality device that is communicatively coupled to a remote server according to an example embodiment of the present invention.

FIG. 2 illustrates an augmented-reality device 200 that is communicatively coupled to a server 210, which can be located remotely, according to an example embodiment of the present invention. As shown in FIG. 2, augmented-reality device 200 may include processor 202, global positioning system (GPS) receiver 203, hyper-local positioning system 204, accelerometer 205, gyroscope 206, network device 207, camera 208, image processor 209, and display 211. As further shown in FIG. 2, server 210 may include server processor 212, network device 217, and image processor 219. In addition, either of augmented-reality device 200 or server 210 may include the additional elements, such as the various elements and software modules depicted and described in connection with FIG. 1. Augmented-reality device 200 may be communicatively coupled to server 210 through a network, for example.

Returning to FIG. 2, the security or border officer may wear an augmented-reality device 200, which can be head-mounted and does not impede their normal field of vision, such as augmented-reality glasses. Alternatively, the security or border officers also may use a handheld device capable of augmented-reality, such as a tablet or smartphone. In either embodiment, the use of augmented-reality enables the real-time monitoring of detailed information that is visually superimposed on one or more persons (e.g., travelers, concert-goers, employees, etc.) transiting the system, without losing situational awareness of the entire area being monitored.

Augmented-reality device 200 may include on-board processing capabilities, such as processor 202 and image processor 209. Processor 202 and/or image processor 209 are configured to ensure that detailed information is visually superimposed on one or more persons transiting the security checkpoint. Cooperation between the on-board processing capabilities and GPS receiver 203 and/or hyper-local positioning system 204 is configured to ensure that the displayed information matches the security or border officer's field of view. In this manner, situational awareness is not compromised when providing the displayed information to the officer. Here, accelerometer 205 and/or gyroscope 206 are further configured to gather information to determine the orientation and movement of augmented-reality device 200 relative to the security checkpoint.

Camera 208 may be configured to periodically or continuously (and in real-time) gather image data from the security checkpoint. Use of camera 208 is optional in connection with embodiments directed to augmented-reality glasses. However, camera 208 is typically used in connection with embodiments directed to a mobile phone or tablet device. In some instances, camera 208 may be configured to operate across spectra, to include non-visible light such as infrared. Alternatively, or additionally, camera 208 may be stereoscopic.

Camera 208 of augmented-reality device 200 may transmit the image data to image processor 209 of augmented-reality device 200 or image processor 219 of server 210. Image processing functions may be executed at image processor 209 or image processor 219, or a combination of image processor 209 and image processor 219. Augmented-reality device 200 also may be configured to transmit its orientation and movement data, global position data, and/or hyper-local position information to processor 202 or server processor 212.

The various systems deployed at the security checkpoint may be integrated with fiduciary marks, which are markers that may be recognized by processing algorithms to provide data about which system or systems are being looked at by the security or border officer, the distance to that system, the relative orientation of the security or border officer to the system, and the relative orientation of that system to other systems at the security checkpoint. The systems may be recognized by their physical geometry by the processing algorithms when fiduciary marks are not present or are obscured. Alternatively, or additionally, the systems may be recognized by hyper-local positioning information provided by hyper-local positioning system 204.

Image processor 209 and/or image processor 219 use the image data, and may use locational data, to determine which system, person, traveler, or area of interest that the security or border officer is observing. Image processor 209 and/or image processor 219 then overlay data related to that system, person, traveler, or area of interest on display 211, in augmented-reality device 200, so that the security or border officer may see both the real-world view of the system and the augmented display of information. This information may take the form of a floating screen, page, or window containing information. Alternatively, or additionally, this information may take the form of an icon, graphics, text, and/or a combination thereof. This information may be updated at or near real-time. In some embodiments, image processor 209 and/or image processor 219 use the image data along with available augmented-reality device orientation data to analyze the security or border officer's location, the fiduciary points and any system geometry within the officer's field of view. Image processor 209, 219 are configured to provide one or more images to overlay on display 211 of augmented-reality device 200.

Figure 3:
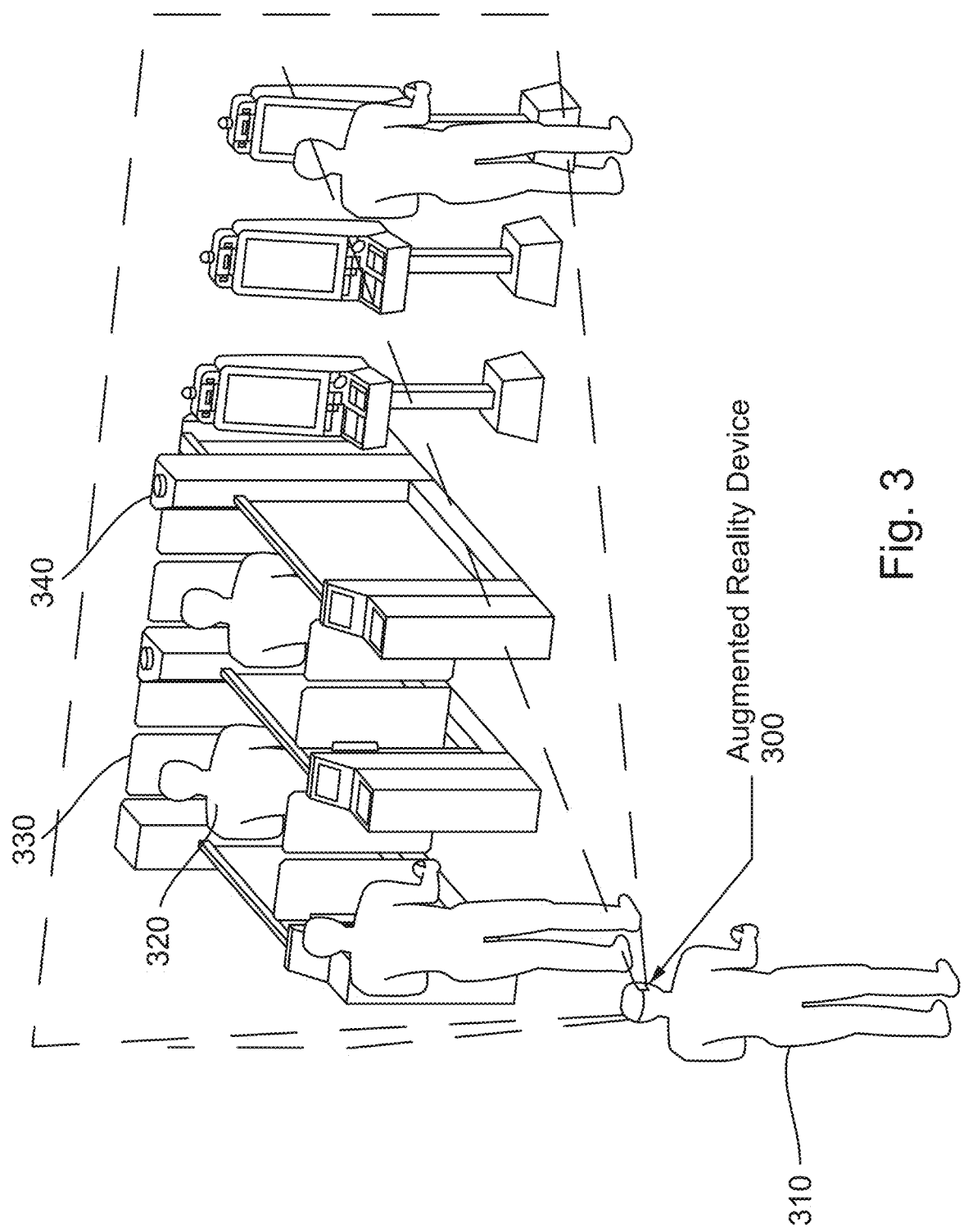
FIG. 3 illustrates an officer using an augmented-reality device to monitor a plurality of security checkpoints according to an example embodiment of the present invention.

FIG. 3 illustrates an officer 310 using an augmented-reality device 300 to monitor persons 320 at a plurality of security checkpoints 330 according to an example embodiment of the present invention.

At security checkpoints 330, which may include an immigration control point or an event admission gate, one or more systems may be monitored. As depicted in FIG. 3, security checkpoints 330 may include multiple system types, such as immigration kiosks, electronic gates, and the like. Systems to be monitored within security checkpoints 330 are not limited to electronic gates and automated kiosks, but may further include immigration booths, environmental sensors, and the like.

Using augmented-reality device 300, officer 310 monitors security checkpoints 330 while maintaining situational awareness. Officer 310 may maintain direct visual awareness of persons 320 interacting with the systems within the security checkpoints 330. For example, officer 310 may wear augmented-reality device 300, which can be augmented-reality glasses, that are configured to superimpose information associated with persons 320 who are passing through security checkpoints 330. As discussed above, fiduciary marks 340 may be included on the systems being monitored at security checkpoints 330.

Figure 4:
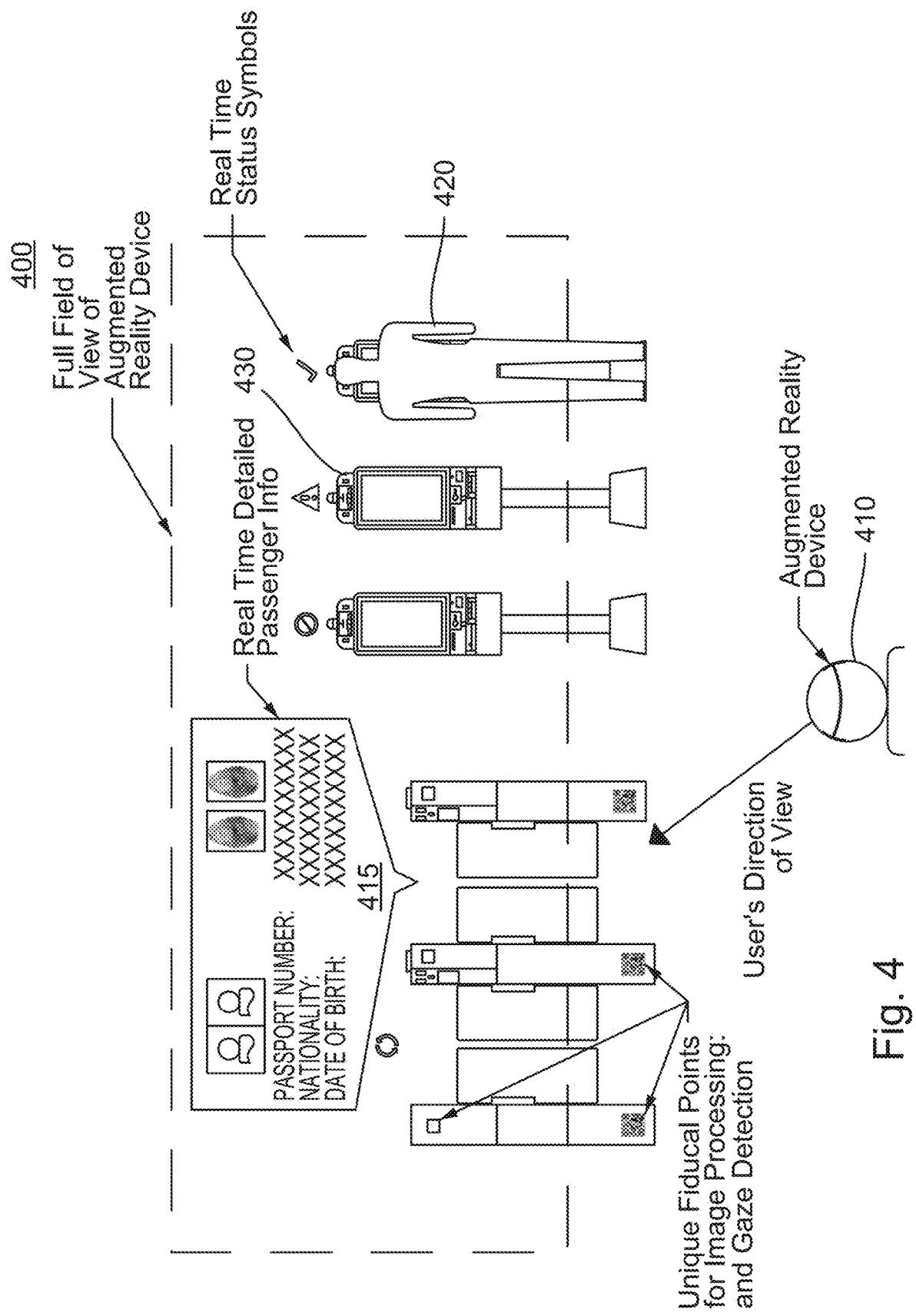
FIG. 4 illustrates an officer's view of security checkpoints through an augmented-reality device according to an example embodiment of the present invention.

FIG. 4 illustrates an officer's view 400 of security checkpoints 430 through an augmented-reality device according to an example embodiment of the present invention.

As depicted in FIG. 4, officer 410 equipped with the augmented-reality device, as described herein, may maintain situational awareness and direct view of security checkpoints 430 while viewing information (e.g., security information) associated with persons 420. The augmented-reality device may utilize one or more of image data, location data, and/or orientation data to superimpose information associated with persons 420, such as person data 415, on view 400.

Person data 415 and/or other displayed information may include real-time detailed traveler information, environmental alarms, real-time status symbols, or any other type of information that provides the security or border officer 410 with requested or pre-determined information while maintaining situational awareness of security checkpoints 430, the systems within it, and the persons or travelers using the system. As shown in FIG. 4, officer 410 is able to retrieve detailed, real-time information on each system and/or person in an intuitive and real-time manner without losing situational awareness and while maintaining direct visibility of the area under control.

FIG. 5 illustrates a network 500 that is configured to connect various components according to an example embodiment of the present invention. As shown in FIG. 5, electronic gates 531, immigration kiosks 532, officer terminals 541, and augmented-reality devices 551 are connected with backend servers 510, 511 that are configured to store person or traveler data, such as security related information.

Figure 6:
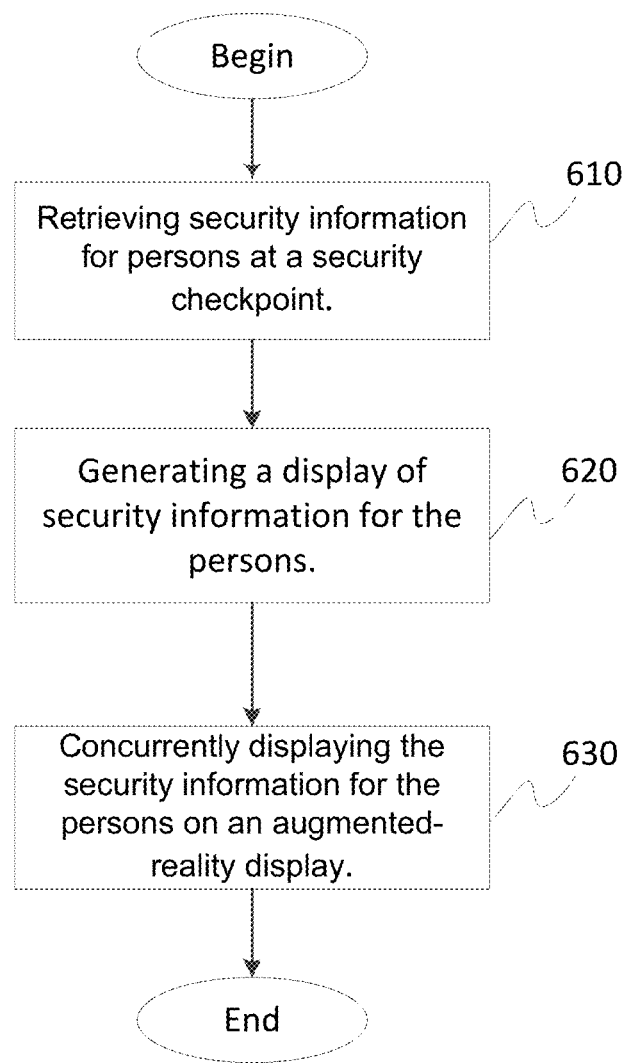
FIG. 6 illustrates a flow diagram of functionality for operating an augmented-reality device according to an example embodiment of the present invention.

FIG. 6 illustrates a flow diagram of functionality 600 for operating an augmented-reality device according to an example embodiment of the present invention. In some instances, functionality 600 of the flow diagram of FIG. 6 is implemented by software stored in memory or other computer readable or tangible media, and executed by a processor. In other instances, the functionality may be performed by hardware (e.g., through the use of an application specific integrated circuit ("ASIC"), a programmable gate array ("PGA"), a field programmable gate array ("FPGA"), etc.), or any combination of hardware and software.

At the outset, functionality 600 may retrieve security information and/or image data for a plurality of persons at security checkpoints, at 610. Next, at 620, functionality 600 may generate one or more displays of the security information and/or the image data. Lastly, at 630, functionality 630 concurrently displays the security information for each of the plurality of persons on an augmented-reality display, wherein the security information is superimposed on or adjacent to each of the plurality of persons located at respective security checkpoints, the displaying configured to maintain visibility of the respective security checkpoints.

By employing the embodiments, an augmented-reality device is used to enable a security officer to simultaneously monitor multiple physical manned or automated border control devices or entry control devices, such as immigration kiosks, electronic gates, or manned posts while maintaining full visibility of the area being monitored. Although example configurations have been described, the invention is not so limited. For example, an alternative configuration is to use a camera-equipped mobile device such as a smartphone or tablet in lieu of a head-mounted augmented-reality device. This will still enable situational awareness as the officer will still be able to see most of the area being monitored through the device camera. In another example, an alternative configuration may use a single fiduciary marker on each system under monitoring. In another example, an alternative configuration may eliminate the use of fiduciary markers and instead recognize the shape of the system under monitoring, which would allow the officer to move around the immigration checkpoint rather than remaining in the area where all fiduciary markers are visible. In yet another example, an alternative configuration may provide all processing power on the augmented-reality device. In yet another example, an alternative configuration may provide all processing power on a connected machine, with the augmented-reality device acting as a simple camera using fast wireless network speeds.

One having ordinary skill in the art will readily understand that the invention as discussed above may be practiced with steps in a different order, and/or with elements in configurations that are different than those which are disclosed. Therefore, although the invention has been described based upon these preferred embodiments, it would be appar-

We claim:

1. An augmented-reality device, the augmented-reality device comprising:
 a processor; and
 a non-transitory memory storing one or more programs for execution by the processor, the one or more programs including instructions for:
 identifying, using the processor, a plurality of persons within a user's field of view;
 retrieving, from a server, security information that includes identification and threat information for each of a plurality of persons within the user's field of view at respective security checkpoints; and
 concurrently displaying the security information for each of the plurality of persons on an augmented-reality display to the user, wherein the security information is updated in real-time and superimposed on or adjacent to each of the plurality of persons located at respective security checkpoints and within the user's field of view, the displaying of the security information is configured to maintain visibility of the respective security checkpoints, and
 wherein the security information being displayed to the user is based on an orientation and location of the augmented-reality display and the user's field of view relative to the respective security checkpoints as determined using one or more fiduciary markers.

2. The augmented-reality device according to claim 1, wherein one or more fiduciary markers are disposed at or adjacent to respective security checkpoints, the fiduciary markers configured to determine location information for the augmented-reality display.

3. The augmented-reality device according to claim 2, wherein one or more hyper-local location sensors are used to determine the location information.

4. The augmented-reality device according to claim 1, wherein the augmented-reality device includes augmented-reality glasses.

5. The augmented-reality device according to claim 1, wherein the augmented-reality device includes a smartphone or tablet.

6. The augmented-reality device according to claim 1, further comprising instructions for retrieving real-time image data, and superimposing the security information of the real-time image data.

7. A non-transitory computer readable storage medium storing one or more programs configured to be executed by a processor, the one or more programs comprising instructions for:
 identifying, using the processor, a plurality of persons within a user's field of view;
 retrieving, from a server, security information that includes identification and threat information for each of a plurality of persons within the user's field of view at respective security checkpoints; and
 concurrently displaying the security information for each of the plurality of persons on an augmented-reality device comprising an augmented-reality display to the user, wherein the security information is updated in real-time and superimposed on or adjacent to each of the plurality of persons located at respective security checkpoints and within the user's field of view, the displaying of the security information is configured to maintain visibility of the respective security checkpoints, and
 wherein the security information being displayed is based on an orientation and location of the augmented-reality display and the user's field of view relative to the respective security checkpoints as determined using one or more fiduciary markers.

8. The non-transitory computer readable storage medium according to claim 7, wherein one or more fiduciary markers are disposed at or adjacent to respective security checkpoints, the fiduciary markers configured to determine location information for the augmented-reality display.

9. The non-transitory computer readable storage medium according to claim 8, wherein one or more hyper-local location sensors are used to determine the location information.

10. The non-transitory computer readable storage medium according to claim 7, wherein the augmented-reality device includes augmented-reality glasses.

11. The non-transitory computer readable storage medium according to claim 7, wherein the augmented-reality device includes a smartphone or tablet.

12. The non-transitory computer readable storage medium according to claim 7, further comprising instructions for retrieving real-time image data, and superimposing the security information of the real-time image data.

13. A method for operating an augmented-reality device, the method comprising:
 identifying, using the processor, a plurality of persons within a user's field of view;
 retrieving, from a server, security information that includes identification and threat information for each of a plurality of persons within a user's field of view at respective security checkpoints; and
 concurrently displaying the security information for each of the plurality of persons on an augmented-reality device comprising an augmented-reality display to the user, wherein the security information is updated in real-time and superimposed on or adjacent to each of the plurality of persons located at respective security checkpoints and within the user's field of view, the displaying of the security information is configured to maintain visibility of the respective security checkpoints, and
 wherein the security information being displayed is based on an orientation and location of the augmented-reality display and the user's field of view relative to the respective security checkpoints as determined using one or more fiduciary markers.

14. The method according to claim 13, wherein one or more fiduciary markers are disposed at or adjacent to respective security checkpoints, the fiduciary markers configured to determine location information for the augmented-reality display.

15. The method according to claim 14, wherein one or more hyper-local location sensors are used to determine the location information.

16. The method according to claim 13, wherein the augmented-reality device includes augmented-reality glasses.

17. The method according to claim 13, wherein the augmented-reality device includes smartphone or tablet.

18. The method according to claim 13, further comprising instructions for retrieving real-time image data, and superimposing the security information of the real-time image data.

19. The augmented-reality device according to claim 1, wherein the security information being displayed to the user based on an orientation and location of the augmented-reality display is relative to a checkpoint and displayed in real-time.

20. The method according to claim 13, wherein the security information being displayed to the user based on an orientation and location of the augmented-reality display is relative to a checkpoint and displayed in real-time.

* * * * *